(12) United States Patent
vom Stein

(10) Patent No.: US 7,353,790 B2
(45) Date of Patent: Apr. 8, 2008

(54) SEALING ARRANGEMENT AND PROCESS FOR PRODUCING SUCH SEALING ARRANGEMENT

(75) Inventor: Hans-Joachim vom Stein, Odenthal (DE)

(73) Assignee: AB SKF, Gothenburg (SE)

( * ) Notice: Subject to any disclaimer, the term of this patent is extended or adjusted under 35 U.S.C. 154(b) by 28 days.

(21) Appl. No.: 11/068,885

(22) Filed: Mar. 2, 2005

(65) Prior Publication Data

US 2005/0193971 A1    Sep. 8, 2005

(30) Foreign Application Priority Data

Mar. 2, 2004    (DE) .................. 10 2004 010 586

(51) Int. Cl.
*F01M 9/10* (2006.01)
(52) U.S. Cl. .................. 123/90.38; 123/90.37; 123/90.33; 29/888.01
(58) Field of Classification Search ............. 123/90.38, 123/90.37, 90.33; 29/888.01
See application file for complete search history.

(56) References Cited

U.S. PATENT DOCUMENTS

| | | | | |
|---|---|---|---|---|
| 4,713,917 A | * | 12/1987 | Buckle et al. | 52/167.1 |
| 5,364,109 A | * | 11/1994 | Sihon | 277/592 |
| 5,928,726 A | * | 7/1999 | Butler et al. | 427/261 |
| 5,957,100 A | * | 9/1999 | Frohwerk et al. | 123/90.38 |
| 6,200,513 B1 | * | 3/2001 | Emmett | 264/274 |
| 2002/0170775 A1 | | 11/2002 | Stein et al. | |

FOREIGN PATENT DOCUMENTS

DE          101 19 892 C2       11/2002

* cited by examiner

*Primary Examiner*—Zelalem Eshete
(74) *Attorney, Agent, or Firm*—Buchanan, Ingersoll & Rooney PC

(57) ABSTRACT

A sealing arrangement for attachment to the contact surface of a device which is to be sealed includes one area opposite the contact surface containing at least two stiffening elements which are arranged in overlapping relation to one another at least at one point and which are securely connected to one another in the overlapping area by an elastomer part which is between the stiffening elements.

19 Claims, 2 Drawing Sheets

SEALING ARRANGEMENT AND PROCESS FOR PRODUCING SUCH SEALING ARRANGEMENT

This application is based on and claims priority under 35 U.S.C. § 119 with respect to German Application No. 10 2004 010 586.3 filed on Mar. 2, 2004, the entire content of which is incorporated herein by reference.

FIELD OF THE INVENTION

The invention generally relates to a sealing arrangement. More particularly, the present invention pertains to a sealing arrangement for attachment to the contact surface of a device which is to be sealed, and a process for producing the sealing arrangement.

BACKGROUND DISCUSSION

DE 101 19 892 C2 discloses a cylinder head cover of an internal combustion engine which includes a carrier element intended for mounting on the internal combustion engine, a cover and an elastomer part which forms a sealing lip and which connects the carrier element and the cover.

SUMMARY

According to one aspect, a sealing arrangement adapted to be attached to a contact surface of a device to be sealed comprises a contact surface and possesses an area opposite the contact surface having at least two stiffening elements arranged in overlapping relation at least at one overlapping area. The two stiffening elements are securely connected to one another in the overlapping area by an elastomer part located between the stiffening elements.

According to another aspect, a cylinder head cover adapted to adjoin a contact surface of an internal combustion engine comprises an elastomer body and at least two stiffening elements embedded in the elastomer body, with portions of the stiffening elements overlapping one another in an overlapping area. The elastomer forming the elastomer body is located between the stiffening elements in the overlapping area to securely connect together the stiffening elements in the overlapping area by the elastomer.

Another aspect involves a process for producing a sealing arrangement that comprises arranging at least two stiffening elements in a tool so that portions of the stiffening elements overlap one another in an overlapping area, and injecting elastomer material into the tool so that at least some of the elastomer material is between the stiffening elements in the overlapping area to securely connect the two stiffening elements to one another in the overlapping area.

BRIEF DESCRIPTION OF THE DRAWING FIGURES

The foregoing and additional features, characteristics and details of the invention will be understood from the following detailed description considered with reference to the accompanying drawing figures in which like elements are designated by like reference numerals.

DETAILED DESCRIPTION

Figure 1:
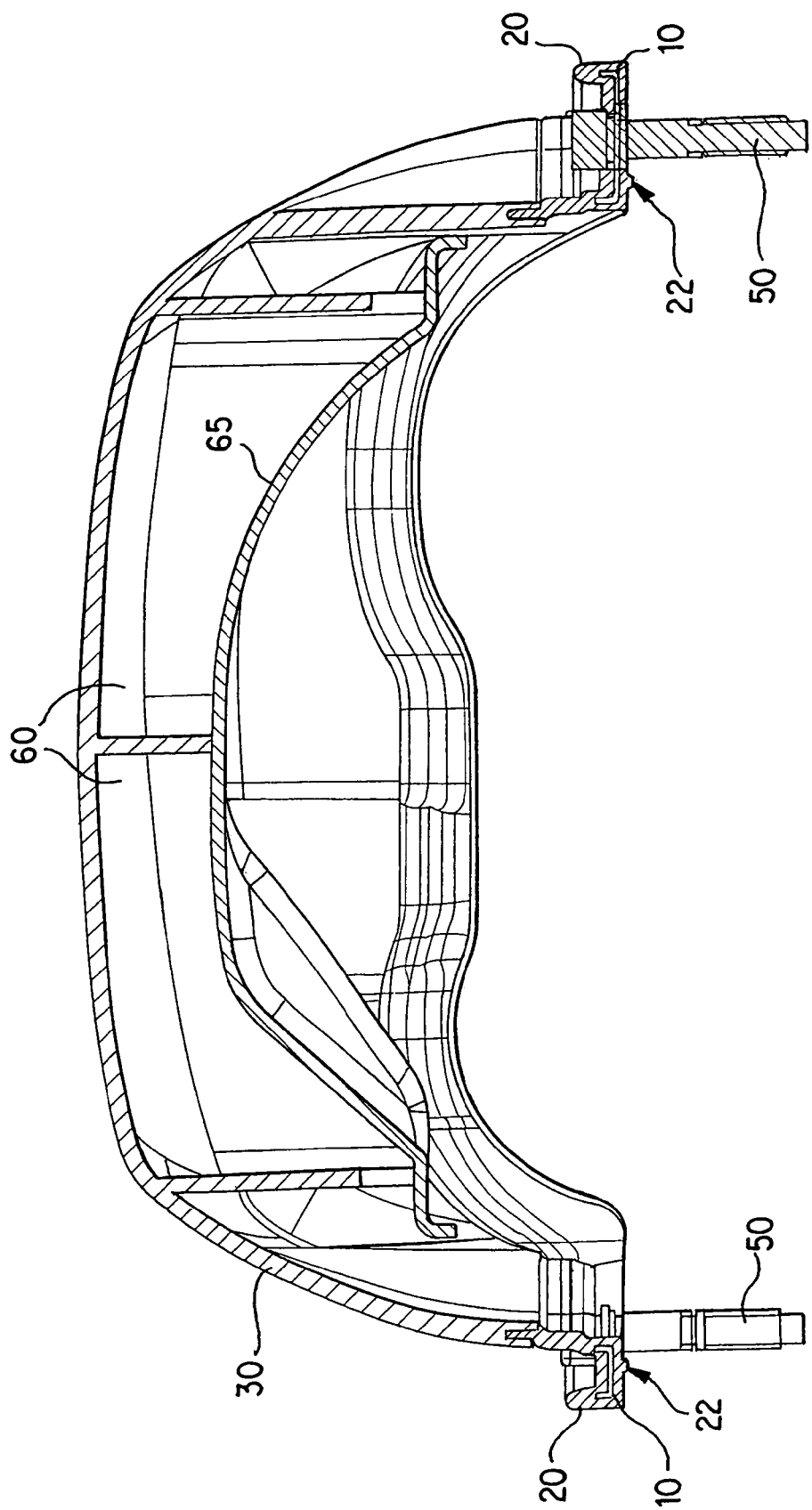
FIG. 1 is a cross-sectional view of a cylinder head cover with a stiffening device.

FIG. 1 shows as one embodiment of the invention a cross-section through the cylinder head cover. The cylinder head cover includes an integral body. The integral body comprises an elastomer part 20 which extends or runs around the periphery of the cylinder head cover like a frame. The elastomer part 20 is provided with a sealing lip 22 for tightly adjoining the contact surface of an internal combustion engine. A stiffening device or stiffening means 10 is generally provided within the elastomer part 20. The stiffening device 10 likewise runs peripherally like a frame and has generally a U-shaped cross-section or profile. In the illustrated embodiment, the stiffening device 10 is composed of several sheet metal stampings.

During manufacture, the stiffening device 10 is coated with an adhesive and the elastomer part 20 is then molded onto the stiffening device 10 by an injection process. The elastomer part 20 comprises rubber or silicone. Furthermore, the elastomer part 20 and the stiffening device 10 are provided with openings or holes through which the cylinder head cover can be attached to the contact surface of the internal combustion engine via fasteners, especially screws 50.

Adjoining the elastomer part 20, the cylinder head cover also comprises a cover-like part 30 of plastic. In the illustrated embodiment, the elastomer part 20 is connected to the cover-like part 30 by virtue of the elastomer part 20 being molded into a U-shaped groove of the cover-like part 30 as shown in FIG. 1. The upper area of the cylinder head cover includes function spaces 60 for oil separation which are bordered at the bottom by the bottom element 65 of the cylinder head cover.

Figure 2:
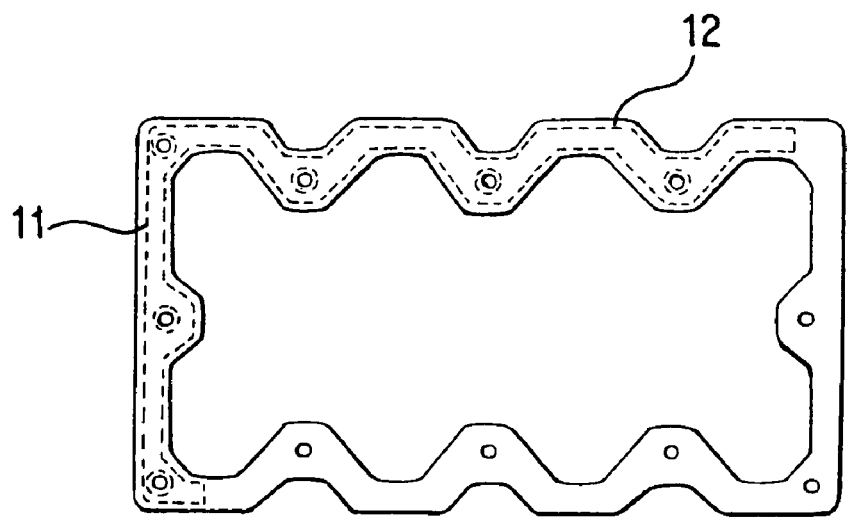
FIG. 2 is a schematic top view illustrating, in a highly simplified manner, the cylinder head cover illustrated in FIG. 1.

FIG. 2 shows in top view the cylinder head cover of FIG. 1 without the screws 50. FIG. 2 shows two stiffening elements 11, 12 which overlap in a corner area and which are indicated by the broken and dot-dash line as components of the stiffening means 10.

Figure 3:
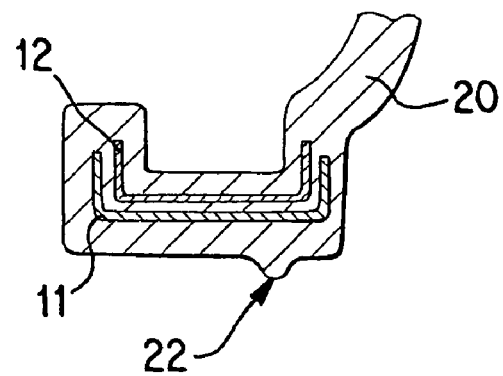
FIG. 3 is a cross-section through one area of the cylinder head cover in the overlapping area of two stiffening elements of the stiffening device.

FIG. 3 illustrates in cross-section the overlapping area of the two stiffening elements 11, 12 shown in FIG. 2. FIG. 3 clearly illustrates that the two stiffening elements 11, 12 are arranged internested with respect to one another or in overlapping relation to one another, with the elastomer part 20 extending between the two stiffening elements 11, 12. The elastomer part 20 thus securely connects the two stiffening elements 11, 12 to one another. Manufacturing proceeds such that the two stiffening elements 11, 12 which are coated with adhesive are inserted into a vulcanizing tool such that their ends are internested in, or overlapping with, one another, and at the same time parts of their surfaces fit against one another in the manner of plates. The stiffening elements are thus arranged in the vulcanizing tool so that the end portions of adjoining stiffening elements fit generally flatly against one another. The adhesive may be applied to the stiffening elements with a bath coating process before the stiffening elements are arranged in the vulcanizing tool. Then, at an elevated temperature of, for example 190° C., and a pressure of, for example 400 bar, an elastomer mass which forms the elastomer part 20 is injected into the vulcanizing tool so that the stiffening elements are almost completely injection coated, with the plate-like surfaces forming large adhesion surfaces to one another such that the stiffening elements 11, 12 are securely joined to one another.

In doing so, more or less automatically between the adjoining adhesive-coated surfaces of the two stiffening elements 11, 12, elastomer mass enters at least partially between the surfaces and forms a thin elastomer layer and the adhesives of the two opposing surfaces react with one another to produce the secure connection. This is promoted at least in part by the surface unevenness that arises, for example, when the stiffening elements 11, 12 are stamped. The elastomer part 20 between the two stiffening elements 11, 12 typically has a thickness between 0 and roughly 1 mm.

The stiffened sealing arrangement possesses a relatively high stiffness. Good stiffening can be achieved with several separate stiffening elements which are securely connected to one another by an elastomer part. Frame-like stiffening arrangements can be composed of several separate stiffening elements so that they can be produced with little cutting and thus in an economical manner compared to one-piece, large-area metal frames. They also can be supplied more easily to a bath coating process, for example to apply an adhesive.

The principles, preferred embodiment and mode of operation have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A cylinder head cover adapted to adjoin a contact surface of an internal combustion engine comprising an elastomer body and a plurality of stiffening elements embedded in the elastomer body, only end portions of adjacent ones of the stiffening elements overlapping one another in an overlapping area, with elastomer forming the elastomer body being located between the overlapping end portions of the adjacent stiffening elements to securely connect together the adjacent stiffening elements by the elastomer, the plurality of stiffening elements being arranged in a shape of a frame.

2. The cylinder head cover according to claim 1, wherein the stiffening elements are sheet metal parts.

3. The cylinder head cover according to claim 1, wherein the stiffening elements are coated with an adhesive for adhesion with respect to the elastomer part.

4. The cylinder head cover according to claim 1, wherein the stiffening elements have a U-shaped cross section.

5. The cylinder head cover according to claim 1, wherein the elastomer between the stiffening elements in the overlapping region has a thickness of less than or equal to 1 mm.

6. A sealing arrangement adapted to be attached to a contact surface of a device to be sealed, the sealing arrangement comprising a plurality of individually separate stiffening elements positioned so that only end portions of adjacent ones of the individually separate stiffening elements overlap one another and so that the plurality of stiffening elements are arranged in a shape of frame, each of the stiffening elements forming only a portion of a circumferential extent of the frame shaped arrangement of the stiffening elements, the end portions of the adjacently positioned stiffening elements being securely connected to one another by an elastomer part located between the end portions of the adjacently positioned stiffening elements.

7. The sealing arrangement according to claim 6, wherein the elastomer part is made such that it surrounds the stiffening elements.

8. The sealing arrangement according to claim 6, wherein the stiffening elements are sheet metal parts.

9. The sealing arrangement according to claim 6, wherein the stiffening elements are coated with an adhesive for adhesion with respect to the elastomer part.

10. The sealing arrangement according to claim 6, wherein the stiffening elements together form a rectangular frame.

11. The sealing arrangement according to claim 10, wherein each of the stiffening elements is positioned along one side of the frame, and the stiffening elements overlap one another at corner areas of the frame.

12. The sealing arrangement according to claim 6, wherein the stiffening elements have a U-shaped cross section.

13. The sealing arrangement according to claim 6, wherein the elastomer part located between the stiffening elements has a thickness of less than or equal to 1 mm.

14. The sealing arrangement according to claim 6, wherein the sealing arrangement is connected to a plastic cover.

15. The sealing arrangement according to claim 6, wherein the sealing arrangement is a part of a cylinder head cover of an internal combustion engine.

16. A process for producing a sealing arrangement, comprising:
    arranging at least two stiffening elements in a tool so that only end portions of adjacently positioned stiffening elements overlap one another in an overlapping area and so that the at least two stiffening elements together are arranged in a shape of a frame surrounding a central opening; and
    injecting elastomer material into the tool so that at least some of the elastomer material is between the end portions of each of the adjacently positioned stiffening elements to securely connect the two stiffening elements to one another in the shape of the frame.

17. The process according to claim 16, wherein the stiffening elements are coated with an adhesive before the stiffening elements are arranged in the tool.

18. The process according to claim 16, wherein the adhesive is applied to the stiffening elements with a bath coating process.

19. A cylinder head cover adjoining a contact surface of an internal combustion engine and attached to the contact surface by a plurality of fasteners, the cylinder head cover comprising a frame-shaped elastomer body, a plurality of stiffening elements embedded in the elastomer body, and a plurality of holes passing through the elastomer body and the stiffening elements, with the fasteners being positioned in the holes, only end portions of adjacent ones of the stiffening elements overlapping one another in an overlapping area, with elastomer forming the elastomer body being located in the overlapping area between the overlapping end portions of the adjacent stiffening elements to securely connect together the adjacent stiffening elements by the elastomer, the plurality of stiffening elements being arranged in a shape of a frame.

* * * * *